United States Patent [19]

Dunne et al.

[11] Patent Number: 5,051,244

[45] Date of Patent: Sep. 24, 1991

[54] USE OF A MOLECULAR SIEVE BED TO MINIMIZE EMISSIONS DURING COLD START OF INTERNAL COMBUSTION ENGINES

[75] Inventors: Stephen R. Dunne, Bethel, Conn.; Raymond A. Reber, Montrose, N.Y.

[73] Assignee: UOP, Des Plaines, Ill.

[21] Appl. No.: 556,149

[22] Filed: Jul. 20, 1990

[51] Int. Cl.⁵ ............................................ B01D 53/36
[52] U.S. Cl. ................................ 423/212; 423/213.5; 423/239; 423/245.1; 423/247
[58] Field of Search ................. 423/213.5, 247, 212 C, 423/239, 245.1

[56] References Cited

U.S. PATENT DOCUMENTS

| | | | |
|---|---|---|---|
| 2,942,932 | 6/1960 | Elliott | 23/2 |
| 3,476,508 | 11/1969 | Kearby et al. | 423/213.5 |
| 3,699,683 | 10/1972 | Tourtellotte et al. | 60/274 |
| 3,767,453 | 10/1973 | Hoekstra | 117/46 CA |
| 3,785,998 | 1/1974 | Hoekstra | 252/477 R |
| 3,920,583 | 11/1975 | Pugh | 252/465 |
| 4,064,073 | 12/1977 | Pomot | 423/213.5 |
| 4,528,279 | 7/1985 | Suzuki et al. | 502/200 |
| 4,760,044 | 7/1988 | Joy et al. | 502/303 |
| 4,791,091 | 12/1988 | Bricker et al. | 502/303 |
| 4,868,148 | 9/1989 | Henk et al. | 502/303 |
| 4,868,149 | 9/1989 | Bricker et al. | 502/303 |
| 4,985,210 | 1/1991 | Minami | 423/213.5 |

FOREIGN PATENT DOCUMENTS 1205980  6/1986  Canada .
3928760  8/1989  Fed. Rep. of Germany .

OTHER PUBLICATIONS

"Multicomponent Adsorption Equilibria on Molecular Sieves", C. M. Yon and P. H. Turnock AICHE Symposium Ser. No. 117, vol. 67 (1971).
Breck, D. W., "Zeolite Molecular Sieves", John Wiley & Sons, N.Y., p. 426.

Primary Examiner—Wayne A. Langel
Attorney, Agent, or Firm—Thomas K. McBride; Eugene I. Snyder; Frank S. Molinaro

[57] ABSTRACT

This invention relates to a process for treating an engine exhaust gas stream. The process involves first flowing the engine exhaust stream, which is relatively cool, over an adsorbent zone which comprises an adsorbent bed, i.e., a molecular sieve bed, capable of preferentially adsorbing pollutants such as hydrocarbons. This provides a first exhaust stream which is flowed over a primary castalyst which converts the pollutants to innocuous compounds and then discharging the resultant treated exhaust stream to the atmosphere. When the adsorbent bed reaches a temperature of about 150° C., the entire engine exhaust stream is completely diverted over the primary catalyst. When the inlet temperature to the primary catalyst has reached about 350° C., a minor portion of the engine exhaust stream is diverted over the adsorbent bed to desorb the pollutants adsorbed on the bed and carry them over the primary catalyst where they are converted to innocuous components. After a certain amount of time, the entire engine exhaust stream is again diverted over the primary catalyst, thereby isolating the adsorbent bed to minimize deterioration. The adsorbent zone may also have a secondary catalyst bed arranged immediately after it.

16 Claims, 2 Drawing Sheets

USE OF A MOLECULAR SIEVE BED TO MINIMIZE EMISSIONS DURING COLD START OF INTERNAL COMBUSTION ENGINES

BACKGROUND OF THE INVENTION

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. Because of these health problem concerns, the Environmental Protection Agency (EPA) has promulgated strict controls on the amounts of carbon monoxide, hydrocarbons and nitrogen oxides which automobiles can emit. The implementation of these controls has resulted in the use of catalytic converters to reduce the amount of pollutants emitted from automobiles.

In order to achieve the simultaneous conversion of carbon monoxide, hydrocarbon and nitrogen oxide pollutants, it has become the practice to employ catalysts in conjunction with air-to-fuel ratio control means which functions in response to a feedback signal from an oxygen sensor in the engine exhaust system. Although these three component control catalysts work quite well after they have reached operating temperature of about 300° C., at lower temperatures they are not able to convert substantial amounts of the pollutants. What this means is that when an engine and in particular an automobile engine is started up, the three component control catalyst is not able to convert the hydrocarbons and other pollutants to innocuous compounds. Despite this limitation, current state of the art catalysts are able to meet the current emission standards. However, California has recently set new hydrocarbon standards (these standards most probably will be promulgated nationwide) which can not be met with the current state of the art three component control catalysts.

Applicants have found a solution to this problem which involves the use of an adsorbent bed to adsorb the hydrocarbons during the cold start portion of the engine. Although the process will be exemplified using hydrocarbons, the instant invention can also be used to treat exhaust streams from alcohol fueled engines as will be shown in detail. Applicants' invention involves taking the exhaust stream which is discharged from an engine during the initial startup of the engine (cold start) and diverting it through an adsorbent bed which preferentially adsorbs hydrocarbons over water under the conditions present in the exhaust stream. The exhaust stream discharged from the adsorbent bed (first exhaust stream) is flowed over a primary catalyst and then discharged into the atmosphere. After a certain amount of time, the adsorbent bed has reached a certain temperature (about 150° C.) at which the bed is no longer able to remove hydrocarbons from the engine exhaust stream. That is, hydrocarbons are actually desorbed from the adsorbent bed instead of being adsorbed. At that point the engine exhaust stream is diverted such that the engine exhaust stream completely bypasses the adsorbent bed and flows directly over the primary catalyst bed.

After an additional amount of time during which the primary catalyst has reached its operating temperature, the engine exhaust stream is divided into a major and minor portion. The major portion of the engine exhaust stream is flowed directly over the primary catalyst while the minor portion of the engine exhaust stream is flowed over the adsorbent bed thereby desorbing the hydrocarbons and any other pollutants that were adsorbed on the bed. The stream from the adsorbent bed (second exhaust stream) is again flowed over the primary catalyst and then discharged into the atmosphere. When all the hydrocarbons have been desorbed from the adsorbent bed, the engine exhaust stream is completely directed over the primary catalyst. This ensures that the adsorbent bed is not exposed to high temperatures which may damage the adsorbent bed.

The adsorbents which may be used to adsorb the hydrocarbons may be selected from the group consisting of molecular sieves which have 1) a Si:Al ratio of at least 2.4; 2) are hydrothermally stable; and 3) have a hydrocarbon selectivity greater than 1. Examples of molecular sieves which meet these criteria are silicalite, faujasites, clinoptilolites, mordenites and chabazite. The adsorbent bed may be in any configuration with a preferred configuration being a honeycomb monolithic carrier having deposited thereon the desired molecular sieve.

The prior art reveals several references dealing with the use of adsorbent beds to minimize hydrocarbon emissions during a cold start engine operation. One such reference is U.S. Pat. No. 3,699,683 in which an adsorbent bed is placed after both a reducing catalyst and an oxidizing catalyst. The patentees disclose that when the exhaust gas stream is below 200° C. the gas stream is flowed through the reducing catalyst then through the oxidizing catalyst and finally through the adsorbent bed, thereby adsorbing hydrocarbons on the adsorbent bed. When the temperature goes above 200° C. the gas stream which is discharged from the oxidation catalyst is divided into a major and minor portion, the major portion being discharged directly into the atmosphere and the minor portion passing through the adsorbent bed whereby unburned hydrocarbons are desorbed and then flowing the resulting minor portion of this exhaust stream containing the desorbed unburned hydrocarbons into the engine where they are burned.

Another reference is U.S. Pat. No. 2,942,932 which teaches a process for oxidizing carbon monoxide and hydrocarbons which are contained in exhaust gas streams. The process disclosed in this patent consists of flowing an exhaust stream which is below 800° F. into an adsorption zone which adsorbs the carbon monoxide and hydrocarbons and then passing the resultant stream from this adsorption zone into an oxidation zone. When the temperature of the exhaust gas stream reaches about 800° F. the exhaust stream is no longer passed through the adsorption zone but is passed directly to the oxidation zone with the addition of excess air.

Finally, Canadian Patent No. 1,205,980 discloses a method of reducing exhaust emissions from an alcohol fueled automotive vehicle. This method consists of directing the cool engine startup exhaust gas through a bed of zeolite particles and then over an oxidation catalyst and then the gas is discharged to the atmosphere. As the exhaust gas stream warms up it is continuously passed over the adsorption bed and then over the oxidation bed.

Applicant's invention differs in several ways from the processes described in the prior art. First, the adsorbent bed used in applicant's process is a selective adsorbent bed which is a molecular sieve bed. What this means is that hydrocarbons and other pollutants are preferentially adsorbed over water which means that the adsorbent bed does not have to be very large in order to adsorb sufficient quantities of hydrocarbons and other pollutants during engine startup. Another distinguishing feature is that when the adsorbent bed exceeds a temperature of about 150° C., the engine exhaust stream is diverted completely away from the adsorbent bed and routed directly over the primary catalyst. Once the three component control catalyst bed reaches the desired operating temperature, the exhaust stream is divided into a major and minor portion with the minor portion being flowed over the adsorbent bed, thereby desorbing the hydrocarbon and any other pollutants adsorbed thereon, while the major portion is directly flowed over the catalyst. Additionally, no excess air or oxygen is added to the catalyst. Applicant's process has the advantage of allowing the three component control catalyst to warm up much faster because the size of the adsorbent bed is minimized. That is, because the molecular sieves used in the adsorbent bed selectively adsorb pollutants over water, the volume of the adsorbent bed is much smaller versus adsorbents in the prior art which do not selectively adsorb pollutants. A smaller adsorbent bed means a smaller heat sink which means that a hotter exhaust gas stream contacts the catalyst. The molecular sieves which are used as the adsorbents also exhibit good hydrothermal stability, thereby minimizing replacement of the adsorbent bed.

SUMMARY OF THE INVENTION

This invention generally relates to a process for treating an engine exhaust stream and in particular a process for minimizing pollutant emissions during the cold start operation of an engine. Accordingly, one embodiment of the invention is a process for treating an engine exhaust gas stream containing pollutants comprising directing the engine exhaust gas stream over an adsorbent zone comprising a molecular sieve bed which preferentially adsorbs the pollutants over water, to provide a first exhaust stream, flowing the first exhaust stream over a primary catalyst to convert substantially all the pollutants contained in the first exhaust stream to innocuous products, thereby providing a treated exhaust gas stream and discharging the treated exhaust stream into the atmosphere, said process being carried out for a time until the adsorbent bed temperature is about 150° C., at which time the engine exhaust gas stream is diverted completely away from the adsorbent zone and routed directly over the primary catalyst until such time as the primary catalyst reaches its operating temperature, at which time the engine exhaust gas stream is divided into a major and minor portion, flowing the major portion of the engine exhaust gas stream over the primary catalyst and then discharging the treated exhaust gas stream from the primary catalyst into the atmosphere, flowing the minor portion of the engine exhaust gas stream over the adsorbent zone for a time sufficient to desorb substantially all the pollutants adsorbed on the molecular sieve bed and provide a second exhaust gas stream containing desorbed pollutants, flowing the second exhaust stream over the primary catalyst to provide a treated exhaust stream and discharging the treated exhaust stream to the atmosphere and after such time as necessary to desorb substantially all the pollutants from the adsorbent bed, the engine exhaust gas stream is completely directed over the primary catalyst to provide a treated exhaust stream and then discharging the treated exhaust stream to the atmosphere.

In a specific embodiment, the molecular sieve bed is a honeycomb monolithic carrier having deposited thereon a molecular sieve selected from the group consisting of molecular sieves having a Si:Al ratio of at least 2.4, is hydrothermally stable and has a hydrocarbon selectivity ($\alpha HC-H_2O$) greater than 1.

In another embodiment, the adsorbent zone comprises a molecular sieve bed followed by a secondary catalyst bed arranged in tandem.

Other objects and embodiments will become more apparent after a more detailed description of the invention.

DETAILED DESCRIPTION OF THE INVENTION

Figure 1:
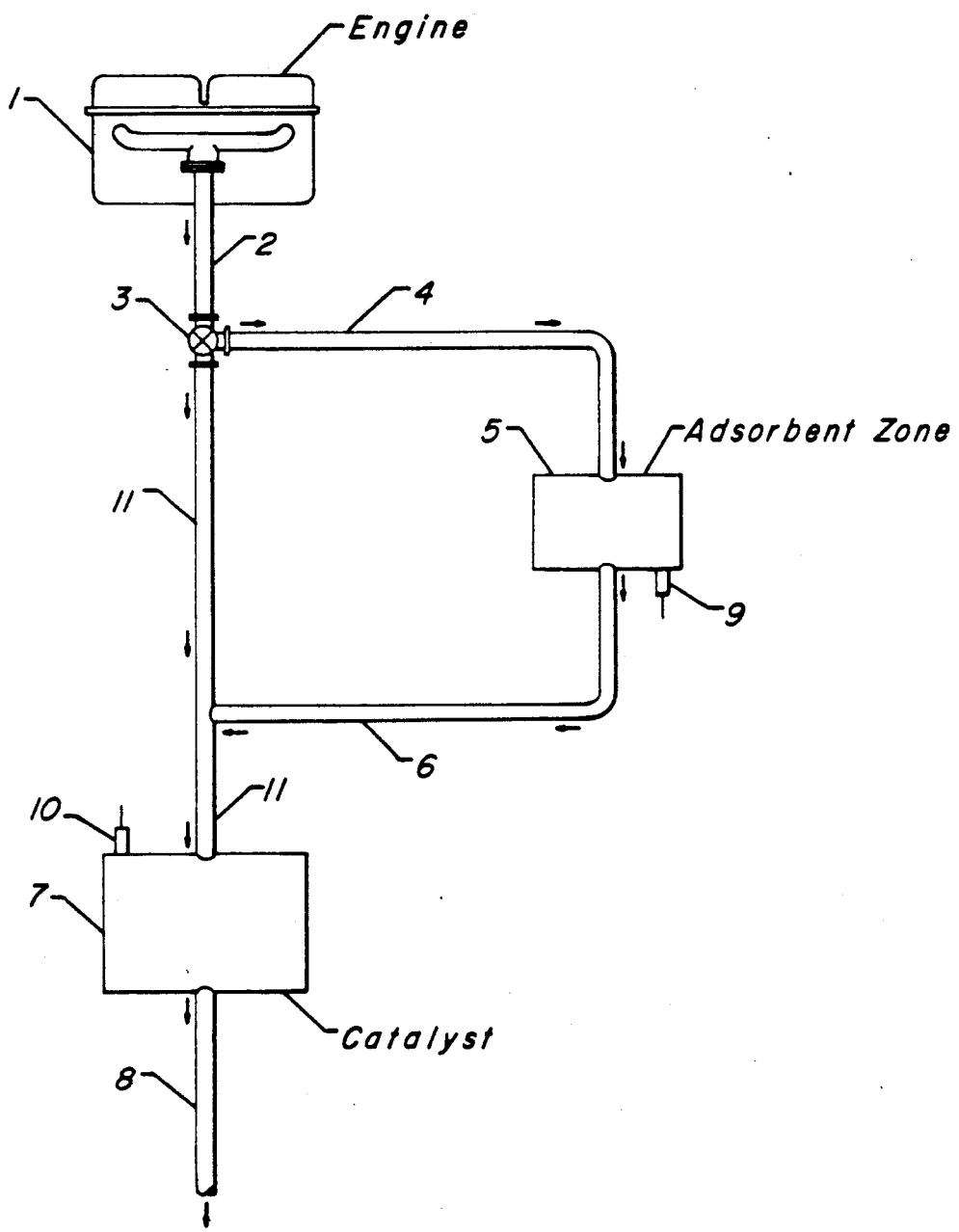
FIG. 1 is a schematic view of one embodiment of this invention showing an internal combustion engine and the process of this invention during the cold start operation.

As stated this invention generally relates to a process for treating an engine exhaust stream and in particular a process for minimizing emissions during the cold start operation of an engine. Referring now to FIG. 1, the engine 1 consists of any internal or external combustion engine which generates an exhaust gas stream containing noxious components including unburned or thermally degraded hydrocarbons or similar organics. Other noxious components usually present in the exhaust gas include nitrogen oxides and carbon monoxide. The engine may be fueled by a hydrocarbonaceous fuel. As used in this specification and in the appended claims, the term "hydrocarbonaceous fuel" includes hydrocarbons, alcohols and mixtures thereof. Examples of hydrocarbons which can be used to fuel the engine are the mixtures of hydrocarbons which make up gasoline or diesel fuel. The alcohols which may be used to fuel engines include ethanol and methanol. Mixtures of alcohols and mixtures of alcohols and hydrocarbons can also be used. Engine 1 may consist of a jet engine, gas turbine, internal combustion engine, such as an automobile, truck or bus engine, a diesel engine or the like. The process of this invention is particularly suited for hydrocarbon, alcohol, or hydrocarbon-alcohol mixture, internal combustion engine mounted in an automobile. Under the conditions of FIG. 1, engine 1 is initially operating at a relatively reduced temperature, such as a cold engine at startup or warmup which produces a relatively high concentration of hydrocarbon vapors (when a hydrocarbon fuel is used) in the engine exhaust gas stream. When an alcohol is the fuel, the exhaust stream will contain unburned alcohol.

For convenience the description will use hydrocarbon as the fuel to exemplify the invention. The use of hydrocarbon in the subsequent description is not to be construed as limiting the invention to hydrocarbon fueled engines.

The engine exhaust gas stream under startup conditions is generally at a temperature below 500° C. and typically in the range of 200° to 400° C., and contains pollutants including high concentration of hydrocarbons as well as nitrogen oxides and carbon monoxide. Pollutants will be used herein to collectively refer to any unburned fuel components and combustion byproducts found in the exhaust stream. For example, when the fuel is a hydrocarbon fuel, hydrocarbons, nitrogen oxides, carbon monoxide and other combustion byproducts will be found in the exhaust gas stream. The engine exhaust stream is produced at this relatively low temperature during the initial period of engine operation, typically for the first 30 seconds to 120 seconds after startup of a cold engine. The engine exhaust stream will typically contain, by volume, 500 to 1000 ppm hydrocarbons.

The engine exhaust stream is flowed through exhaust pipe 2 and through diverting valve 3 which directs the stream through exhaust pipe 4 and through adsorbent zone 5 to provide a first exhaust stream. Adsorbent zone 5 contains one or more beds of a suitable adsorbent for hydrocarbons. The adsorbents which can be used for the practice of this invention are molecular sieves as characterized herein. Hereinafter, the adsorbent bed will be referred to as a molecular sieve bed. The hydrocarbons and other noxious components are selectively adsorbed, i.e., preferentially over water, in the molecular sieve bed. In addition to the molecular sieve bed, the adsorbent zone may contain a secondary catalyst bed in a tandem arrangement with the molecular sieve bed, i.e., immediately after the adsorbent bed. The function of the secondary catalyst bed is to oxidize the hydrocarbons and carbon monoxide in the exhaust stream. This secondary catalyst is characterized in that it operates at a lower temperature than the primary catalyst. Both catalysts will be more fully described herein.

The first exhaust stream which is discharged from the adsorbent zone is now flowed through exhaust pipe 6 to exhaust pipe 11 and through primary catalyst bed 7 to provide a treated exhaust stream. The function of the primary catalyst is to convert the pollutants in the first exhaust gas stream to innocuous components. When the engine is fueled by a hydrocarbon, the primary catalyst is referred to in the art as a three component control catalyst because it can simultaneously oxidize any residual hydrocarbons present in the first exhaust stream or engine exhaust stream to carbon dioxide and water, oxidize any residual carbon monoxide to carbon dioxide and reduce any residual nitric oxide to nitrogen and oxygen. In some cases the primary catalyst may not be required to convert nitric oxide to nitrogen and oxygen, e.g., when an alcohol is used as the fuel. In this case the catalyst is called an oxidation catalyst. Because of the relatively low temperature of the exhaust stream, this primary catalyst does not function at a very high efficiency, thereby necessitating the adsorbent bed 5. The treated exhaust stream that is discharged from catalyst bed 7 is then flowed through exhaust pipe 8 and discharged to the atmosphere. It is understood that prior to discharge into the atmosphere the treated exhaust stream may be flowed through a muffler or other sound reduction apparatus well known in the art.

The temperature at the exit of the adsorbent bed 5 is measured by temperature sensing element 9 which typically consists of a thermocouple or other temperature sensing device which transmits an electrical signal to a microprocessor located on the engine. At a preset adsorbent bed temperature usually in the range of 150° C. to about 200° C., the microprocessor sends a message to control valve 3 thereby completely closing control valve 3, which bypasses adsorbent zone 5 and allows the entire engine exhaust stream to be diverted through exhaust pipe 11 and flow through the primary catalyst bed 7.

The gas temperature at the entrance to the primary catalyst bed is measured by another temperature sensing element 10 which also sends a signal to the same microprocessor. At a preset catalyst gas inlet temperature from sensor 10, typically in the range of 350° to 400° C. the microprocessor sends a signal to valve 3 to partially open valve 3 such that a minor portion of the engine exhaust stream is flowed through exhaust pipe 4, through adsorbent zone 5 and then through the primary catalyst bed 7 while the major portion of the engine exhaust stream from valve 3 is flowed through exhaust pipe 11 and then through the primary catalyst bed 7.

The minor portion of the now hot engine exhaust gas stream which flows through adsorbent zone 5 desorbs the hydrocarbons and any nitric oxide and carbon monoxide (pollutants) adsorbed on the adsorbent bed to provide a second exhaust stream and which flows through exhaust pipes 6 and 11 to the primary catalyst bed 7 where the pollutants are converted to innocuous compounds to provide a treated exhaust stream which is then discharged to the atmosphere via exhaust pipe 8. After a period of time in which substantially all the pollutants are desorbed from the adsorbent bed, (by substantially is meant at least 95% of the pollutants), generally about 3 to about 5 minutes, the microprocessor sends a signal to control valve 3 to divert all the engine exhaust stream directly over the primary catalyst bed 7 via exhaust pipe 11 to provide a treated exhaust stream which is then discharged to the atmosphere via exhaust pipe 8. Instead of waiting for a predetermined time, valve 3 may be closed, i.e., divert all the engine exhaust stream over catalyst bed 7, when the temperature measured by sensor 9 reaches a temperature of about 650° C.

The adsorbent which is used in adsorbent zone 5 is a molecular sieve which has a high selectivity for hydrocarbon versus water. In particular, the molecular sieves which can be used in this invention have the following characteristics: 1) a framework Si:Al ratio of at least 2.4; 2) are hydrothermally stable and 3) have a hydrocarbon selectivity ($\alpha HC-H_2O$) greater than 1.0. By hydrothermally stable is meant the ability of the molecular sieve to maintain its structure after thermal cycling in the exhaust gas stream. One method of measuring hydrothermal stability is to look at the temperature at which 50% of the structure is decomposed after heating for 16 hours in air. The temperature is referred to as T(50). Accordingly, as used in this application, by hydrothermally stable is meant a molecular sieve which has a T(50) of at least 750° C. The hydrocarbon selectivity $\alpha$ is defined by the following equation:

$$\alpha HC-H_2O = \frac{x_{HC}}{x_{H_2O}} \cdot \frac{[H_2O]}{[HC]}$$

$X_{HC}$ = the hydrocarbon co-loading on the molecular sieve in equilibrium with the hydrocarbon water vapor mixture in the gas phase over the zeolite adsorbent;

$X_{H_2O}$ = the water co-loading on the molecular sieve in equilibrium with the water and hydrocarbon vapor mixture in the gas phase over the molecular sieve adsorbent;

[$H_2O$] = the concentration of water vapor in the exhaust gas stream; and

[HC] = the concentration of the hydrocarbon species in the exhaust gas.

The above definitions show that the selectivity of molecular sieves for hydrocarbons over water is dependent upon the exhaust gas stream temperature, the particular hydrocarbon species of interest and the relative concentrations of water vapor and hydrocarbon.

In order to calculate $X_{HC}$ and $X_{H_2O}$ one needs to first determine the intrinsic adsorption strength of the molecular sieve. Intrinsic adsorption strength can be described by reference to the Dubinin Polanyi model for adsorption. The model says that the sorption expressed as the volume of the sorbent structure occupied by the sorbate is a unique function of the Gibbs Free Energy change on adsorption. Mathematically this relationship takes the form of a Gaussian distribution with Gibbs free energy change as follows:

$$X = \text{Liq. dens} * VO * \exp(-B * G * G)$$

where X is the loading expected, VO is the pore volume (cc/g), B is a constant that is dependent on the sorbent and sorbate, and G is the Gibbs Free Energy change. The product of liquid density and VO equates to the saturation loading, XO, for any pure compound by the Gurvitsch Rule. (see Breck, Zeolite Molecular Sieves, page 426.)

For ideal gases $G = RT \ln(P^o/P)$.

The constant B is then inversely related to the intrinsic adsorption strength. For example, if the hydrocarbon is benzene, a value of B of 0.04 for both benzene and water gives good results. The estimates of water and hydrocarbon co-loadings are made in the following way:

1) each individual component loading is estimated by use of the Dubinin Polanyi model as outlined above. For each compound present one needs to know the liquid phase density (approximating the sorbed phase density), the vapor pressure as a function of temperature, and the actual concentration of the species in the gas.

2) Once each pure component loading is calculated, the function $\Phi$ is calculated as, $$\Phi = X/XO/(1 - X/XO)$$

where X/XO is the loading ratio or fraction of the pore volume filled by each component if it were present alone. $\Phi$ then represents the ratio of occupied pore volume to unoccupied pore volume.

3) The co-loadings are then calculated, accounting for each species present, by the formula, $$X_{mc} = XO * \Phi/(1 + \Sigma \Phi)$$

$X_{mc}$ is the co-loading of each component on the zeolite. This procedure follows the Loading Ratio Correlation, which is described in "Multicomponent Adsorption Equilibria on Molecular Sieves", C. M. Yon and P. H. Turnock AICHE Symposium Series, No. 117, Vol. 67 (1971).

Both natural and synthetic molecular sieves may be used as adsorbents. Examples of natural molecular sieves which can be used are faujasites, clinoptilolites, mordenites, and chabazite. Examples of synthetic molecular sieves which can be used are silicalite, Zeolite Y, ultrastable zeolite Y, ZSM-5. Of course mixtures of these molecular sieves both natural and synthetic can be used.

The adsorbent bed used in the instant invention can be conveniently employed in particulate form or the adsorbent, i.e., molecular sieve, can be deposited onto a solid monolithic carrier. When particulate form is desired, the adsorbent can be formed into shapes such as pills, pellets, granules, rings, spheres, etc. In the employment of a monolithic form, it is usually most convenient to employ the adsorbent as a thin film or coating deposited on an inert carrier material which provides the structural support for the adsorbent. The inert carrier material can be any refractory material such as ceramic or metallic materials. It is desirable that the carrier material be unreactive with the adsorbent and not be degraded by the gas to which it is exposed. Examples of suitable ceramic materials include sillimanite, petalite, cordierite, mullite, zircon, zircon mullite, spodumene, alumina-titanate, etc. Additionally, metallic materials which are within the scope of this invention include metals and alloys as disclosed in U.S. Pat. No. 3,920,583 which are oxidation resistant and are otherwise capable of withstanding high temperatures.

The carrier material can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. Nos. 3,785,998 and 3,767,453.

The molecular sieve is deposited onto the carrier by any convenient way well known in the art. A preferred method involves preparing a slurry using the molecular sieves and coating the monolithic honeycomb carrier with the slurry. The slurry can be prepared by means known in the art such as combining the appropriate amount of the molecular sieve and a binder with water. This mixture is then blended by using means such as sonification, milling, etc. This slurry is used to coat a monolithic honeycomb by dipping the honeycomb into the slurry, removing the excess slurry by draining or blowing out the channels, and heating to about 100° C. If the desired loading of molecular sieve is not achieved, the above process may be repeated as many times as required to achieve the desired loading.

The size of the adsorbent bed is chosen such that at least 40% of the hydrocarbons in the exhaust stream discharged from the engine is adsorbed. Generally, this means that the size of the adsorbent bed varies from about 1 to about 3 liters. When the adsorbent is deposited on a monolithic honeycomb carrier, the amount of adsorbent on the carrier varies from about 100 to about 450 grams. It is desirable to optimize the volume of the adsorbent bed such that the primary catalyst downstream from the adsorbent bed is heated as quickly as possible while at the same time ensuring that at least 40% of the hydrocarbons in the exhaust stream are adsorbed on the adsorbent bed. It is preferred that the adsorbent be deposited on a monolithic honeycomb carrier in order to minimize the size of the adsorbent bed and the back pressure exerted on the engine.

Instead of depositing the molecular sieve onto a monolithic honeycomb structure, one can take the molecular sieve and form it into a monolithic honeycomb structure.

The adsorbent which is a molecular sieve may optionally contain one or more catalytic metals dispersed thereon. The metals which can be dispersed on the adsorbent are the noble metals which consist of platinum, palladium, rhodium, ruthenium, and mixtures thereof. The desired noble metal may be deposited onto the adsorbent, which acts as a support, in any suitable manner well known in the art. One example of a method of dispersing the noble metal onto the adsorbent support involves impregnating the adsorbent support with an aqueous solution of a decomposable compound of the desired noble metal or metals, drying the adsorbent which has the noble metal compound dispersed on it and then calcining in air at a temperature of about 400° to about 500° C. for a time of about 1 to about 4 hours. By decomposable compound is meant a compound which upon heating in air gives the metal or metal oxide. Examples of the decomposable compounds which can be used are set forth in U.S. Pat. No. 4,791,091 which is incorporated by reference. Preferred decomposable compounds are chloroplatinic acid, rhodium trichloride, chloropalladic acid, hexachloroiridate (IV) acid and hexachlororuthenate. It is preferable that the noble metal be present in an amount ranging from about 0.01 to about 4 weight percent of the adsorbent support. Specifically, in the case of platinum and palladium the range is 0.1 to 4 weight percent, while in the case of rhodium and ruthenium the range is from about 0.01 to 2 weight percent.

These catalytic metals are capable of oxidizing the hydrocarbon and carbon monoxide and reducing the nitric oxide components to innocuous products. Accordingly, the adsorbent bed can act both as an adsorbent and as a catalyst.

The primary catalyst which is used in this invention is selected from any three component control or oxidation catalyst well known in the art. Examples of primary catalysts are those described in U.S. Pat. Nos. 4,528,279; 4,791,091; 4,760,044; 4,868,148; and 4,868,149, which are all incorporated by reference. Preferred primary catalysts well known in the art are those that contain platinum and rhodium and optionally palladium, while oxidation catalysts usually do not contain rhodium. Oxidation catalysts usually contain platinum and/or palladium metal. These catalysts may also contain promoters and stabilizers such as barium, cerium, lanthanum, nickel, and iron. The noble metals and promoters and stabilizers are usually deposited on a support such as alumina, silica, titania, zirconia, alumino silicates, and mixtures thereof with alumina being preferred. The primary catalyst can be conveniently employed in particulate form or the catalytic composite can be deposited on a solid monolithic carrier with a monolithic carrier being preferred. The particulate form and monolithic form of the primary catalyst are as described for the adsorbent above.

As stated, another embodiment of the invention is an adsorbent bed in a tandem arrangement with a secondary catalyst bed, i.e., immediately after the adsorbent bed. This secondary catalyst bed will contain a catalyst which is different from the primary catalyst. This secondary catalyst has the characteristic that it can function more effectively at lower temperatures. Also its major function is to convert hydrocarbons and carbon monoxide to carbon dioxide and water. Additionally, since the secondary catalyst will not be exposed to high temperatures, it is not necessary that the secondary catalyst be stable at high temperatures, e.g., greater than 700° C.

These catalysts are known in the art and usually comprise platinum and/or palladium dispersed on a high surface area support such as a gamma alumina. Promoters such as lanthanum, cerium, etc. may be added to the catalyst. This secondary catalyst can be either in particulate form or can be deposited onto a solid monolithic carrier as described above for the primary catalyst. The methods used to prepare this secondary catalyst are analogous to those described for preparing a three component control or oxidation catalyst.

The following examples are presented in illustration of this invention and are not intended as undue limitations on the generally broad scope of the invention as set out in the appended claims.

EXAMPLE 1

A slurry was prepared using Y-54 and Ludox AS-40 binder. Y-54 is an ultrastable sodium Y zeolite with a $SiO_2/Al_2O_3$ ratio of 5, and $A_o$ of 24.68 Å and a Na/Al ratio of 0.93. Y-54 is produced and was obtained from UOP. Ludox As-40 is an ammonium stabilized colloidal silica containing 40 weight percent solids with 20 micron spherical $SiO_2$ particles and is available from DuPont Corp. To 141 grams of distilled water, there was added 100 grams of Ludox AS-40. To this mixture there were added 191 grams of Y-54 zeolite and then 551 grams of water. This mixture was sonified for 10 minutes using a Sonifier Cell Disruptor 350.

A ceramic monolithic honeycomb carrier manufactured by Corning Glass Works measuring 28 mm in diameter by 50 mm in length was dipped into the slurry, pulled out and allowed to drain. The wet honeycomb was air dried and then heated at 100° C. for 1 hour. The monolith contained 4.1 grams of zeolite plus binder. This sample was designated sample A.

EXAMPLE 2

A monolithic honeycomb was prepared as in Example 1 except that the adsorbent used was Y-84. Y-84 is the ammonium form of stabilized Y zeolite with an $A_o$ of 24.55 Å, an $NH_4/Al$ of 0.3 and a Na/Al of less than 0.01. Y-84 was also obtained from UOP. This sample contained 4.2 grams of zeolite plus binder and was designated sample B.

EXAMPLE 3

A monolithic honeycomb was prepared as in Example 1 except that the adsorbent used was SA-15. Sa-15 is a steamed form of Y-84 with an $A_o$ of 24.29 Å and $NH_4/Al$ and a Na/Al ratio of less than 0.01. This sample contained 5.5 grams of zeolite plus binder and was designated sample C.

EXAMPLE 4

Samples A, B and C were tested to determine their hydrocarbon adsorption properties by using the following test procedure. The sample to be tested, measuring 28 mm in diameter by 50 mm in length and having a volume of 30.8 cc was placed in a tubular glass reactor. Over this adsorbent bed there was flowed a gas stream containing 998 ppm of propylene, 17,570 ppm of water and the remainder nitrogen. The test was run by starting with a cold (room temperature) adsorbent bed and gas stream flowing the gas stream at a flow rate of 7 Standard Liters Per Minute (SLPM) over the adsorbent while heating the gas stream from about 25° C. to about 360° C. in approximately 400 seconds.

The hydrocarbon retention was calculated by integrating the difference between the instantaneous mass flow of hydrocarbons into and out of the adsorbent. The percentage of the hydrocarbons retained was calculated by dividing the net hydrocarbon retention by the integral of the hydrocarbons flowed into the bed. Plots of hydrocarbon retention versus time for samples A, B and C are presented in FIG. 2.

Figure 2:
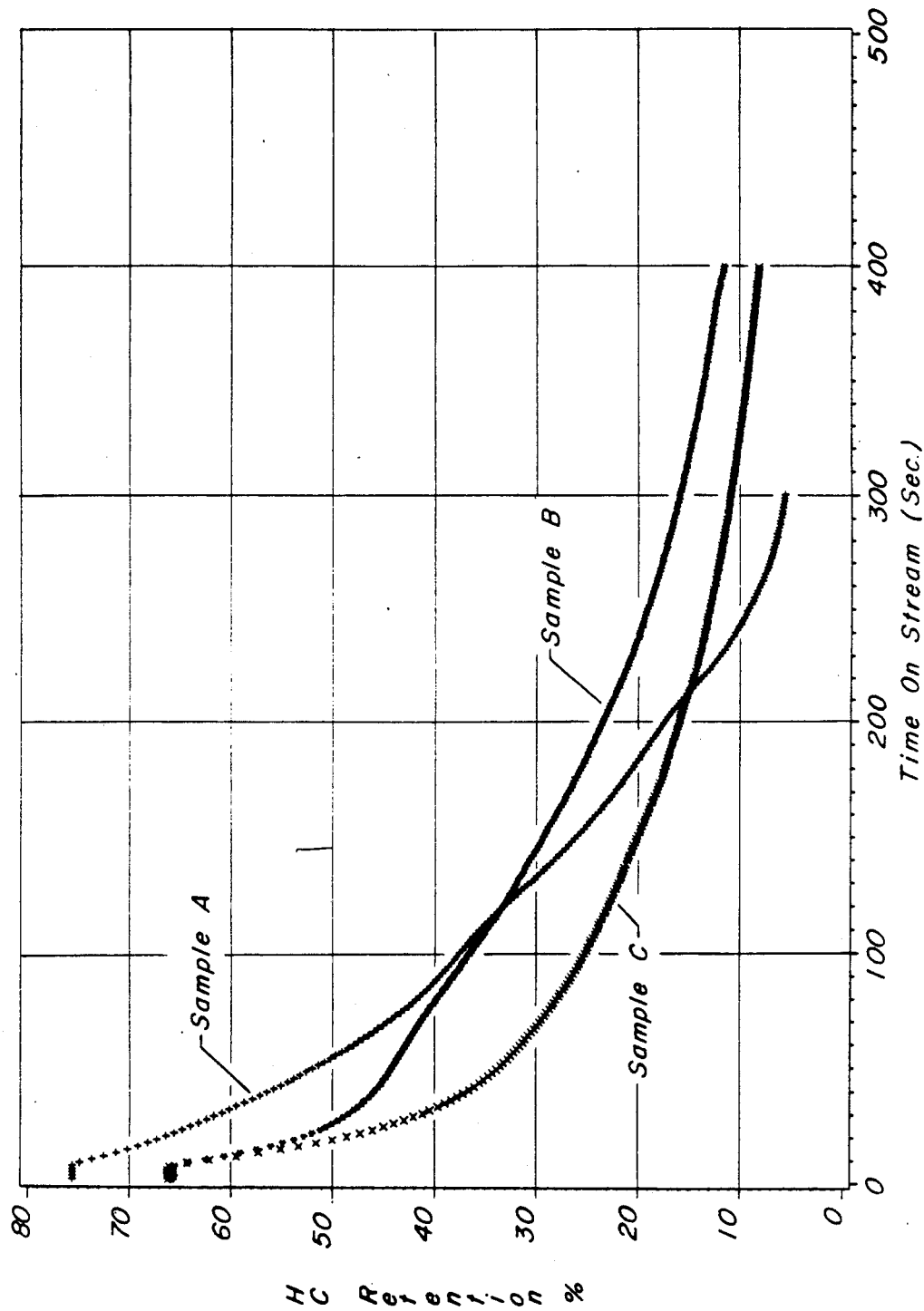
FIG. 2 is a graph of percent hydrocarbon retention versus time on which are presented three plots showing the results for three different molecular sieve adsorbents.

The results presented in FIG. 2 show that sample A has the largest initial value of hydrocarbon retention, but the retention falls off quickly. Samples B and C have lower initial retention but fall off more slowly with sample B being the best. It is clear from this test that any of the three zeolites tested can be used to selectively adsorb hydrocarbons during the cold-start phase of an automobile engine.

Thus, having described the invention in detail, it will be understood by those skilled in the art that certain variations and modifications may be made without departing from the spirit and scope of the invention as defined herein and in the appended claims.

We claim as our invention:

1. A process for treating an engine exhaust gas stream containing hydrocarbons and other pollutants comprising directing the engine exhaust gas stream over an adsorbent zone comprising a molecular sieve bed which preferentially adsorbs the hydrocarbons over water, to provide a first exhaust stream, flowing the first exhaust stream over a primary catalyst to convert substantially all the pollutants contained in the first exhaust stream to innocuous products, thereby providing a treated exhaust gas stream and discharging the treated exhaust stream into the atmosphere, said process being carried out for a time until the molecular sieve bed temperature is about 150° C., at which time the engine exhaust gas stream is diverted completely away from the adsorbent zone and routed directly over the primary catalyst until such time as the primary catalyst reaches its operating temperature, at which time the engine exhaust gas stream is divided into a major and minor portion, flowing the major portion of the engine exhaust gas stream over the primary catalyst and then discharging the treated exhaust gas stream from the primary catalyst into the atmosphere, flowing the minor portion of the engine exhaust gas stream over the adsorbent zone for a time sufficient to desorb substantially all the hydrocarbons adsorbed on the molecular sieve bed and provide a second exhaust gas stream containing desorbed hydrocarbons, flowing the second exhaust stream over the primary catalyst to provide a treated exhaust stream and discharging the treated exhaust stream to the atmosphere and after such time as necessary to desorb substantially all the hydrocarbons from the molecular sieve bed, the engine exhaust gas stream is completely directed over the primary catalyst to provide a treated exhaust stream and then discharging the treated exhaust stream to the atmosphere; the molecular sieve characterized in that it is selected from the group consisting of molecular sieves which have: 1) a framework Si:Al ratio of at least 2.4; 2) are hydrothermally stable; and 3) have a hydrocarbon selectivity ($\alpha HC-H_2O$) greater than 1 where $\alpha HC-H_2O$ is defined by the following equation:

$$\alpha HC-H_2O = \frac{x_{HC}}{x_{H_2O}} \cdot \frac{[H_2O]}{[HC]}$$

where $x_{HC}$ is the hydrocarbon co-loading on the molecular sieves in equilibrium with the hydrocarbon water vapor mixture in the gas phase over the molecular sieve adsorbent; $x_{H_2O}$ is the water co-loading on the zeolite in equilibrium with the water and hydrocarbon vapor mixture in the gas phase over the molecular sieve adsorbent; $[H_2O]$ is the concentration of water and $[HC]$ is the concentration of hydrocarbon.

2. The process of claim 1 where the engine is an internal combustion engine.

3. The process of claim 2 where the internal combustion engine is an automobile engine.

4. The process of claim 1 where the engine is fueled by a hydrocarbonaceous fuel.

5. The process of claim 4 where the fuel is a hydrocarbon.

6. The process of claim 4 where the fuel is an alcohol.

7. The process of claim 1 where the molecular sieve is selected from the group consisting of silicalite, faujasite, clinoptilolites, mordenites, chabazite, zeolite ultrastable Y, zeolite Y, ZSM-5 and mixtures thereof.

8. The process of claim 7 where the molecular sieve is faujasite.

9. The process of claim 7 where the molecular sieve is ultrastable zeolite Y.

10. The process of claim 1 where the molecular sieve bed is a honeycomb monolithic carrier having deposited thereon a molecular sieve selected from the group consisting of molecular sieves having a Si:Al ratio of at least 2.4, is hydrothermally stable and has a hydrocarbon selectivity ($\alpha HC-H_2O$) greater than 1.

11. The process of claim 1 where the molecular sieve has deposited thereon a metal selected from the group consisting of platinum, palladium, rhodium, ruthenium and mixtures thereof.

12. The process of claim 11 where the metal is platinum.

13. The process of claim 11 where the metal is palladium.

14. The process of claim 11 where the metal is a mixture of platinum and palladium.

15. The process of claim 1 where the adsorbent zone comprises a molecular sieve bed followed by a secondary catalyst bed arranged in tandem.

16. The process of claim 15 where the secondary catalyst bed is a honeycomb monolithic carrier having deposited thereon a gamma alumina support which has dispersed thereon palladium metal.

* * * * *